United States Patent [19]
Hertrich

[11] 3,760,206
[45] Sept. 18, 1973

[54] LIGHTWEIGHT LINEAR MOTOR

[75] Inventor: Friedrich R. Hertrich, Boulder, Colo.

[73] Assignee: Iomec, Inc., Santa Clara, Calif.

[22] Filed: Jan. 12, 1972

[21] Appl. No.: 217,119

[52] U.S. Cl. .................................... 310/13, 310/27
[51] Int. Cl. ............................................ H02k 41/02
[58] Field of Search................... 318/135, 687, 38; 310/12, 13, 14, 27; 179/115 R, 115.5 R

[56] References Cited
UNITED STATES PATENTS
3,604,959   9/1971   Sturman........................ 318/135 X OTHER PUBLICATIONS
Rexford – High Force Constant Voice Coil Motor For Rapid Seek IBM Technical Disclosure Bulletin, Vol. 12, No. 12, 5/1970 p. 2273.

*Primary Examiner* — J. D. Miller
*Assistant Examiner* — H. Huberfeld
*Attorney* — Stephen S. Townsend et al.

[57] ABSTRACT

A linear motor for the positioning of objects such as magnetic pickup heads and the like comprising a support structure that mounts a guide rod, an annular permanent magnet, and a concentric pole piece that is spaced from the magnet. A voice coil assembly slidably engages the rod and a cylindrical surface of the pole piece and slides linearly along the rod and the surface into and out of an annular space between the magnets. An electric conductor is wound about a lightweight sleeve of the coil assembly and connected with an electric power source for generating electromagnetic forces and linearly moving the motor. The coil assembly includes means for mounting the pickup head or the like and an arm that extends radially away from the assembly into engagement with a guide track on the support structure to prevent rotary motions of the coil assembly on the rod or the cylindrical surface.

19 Claims, 4 Drawing Figures

PATENTED SEP 18 1973 3,760,206
SHEET 1 OF 2
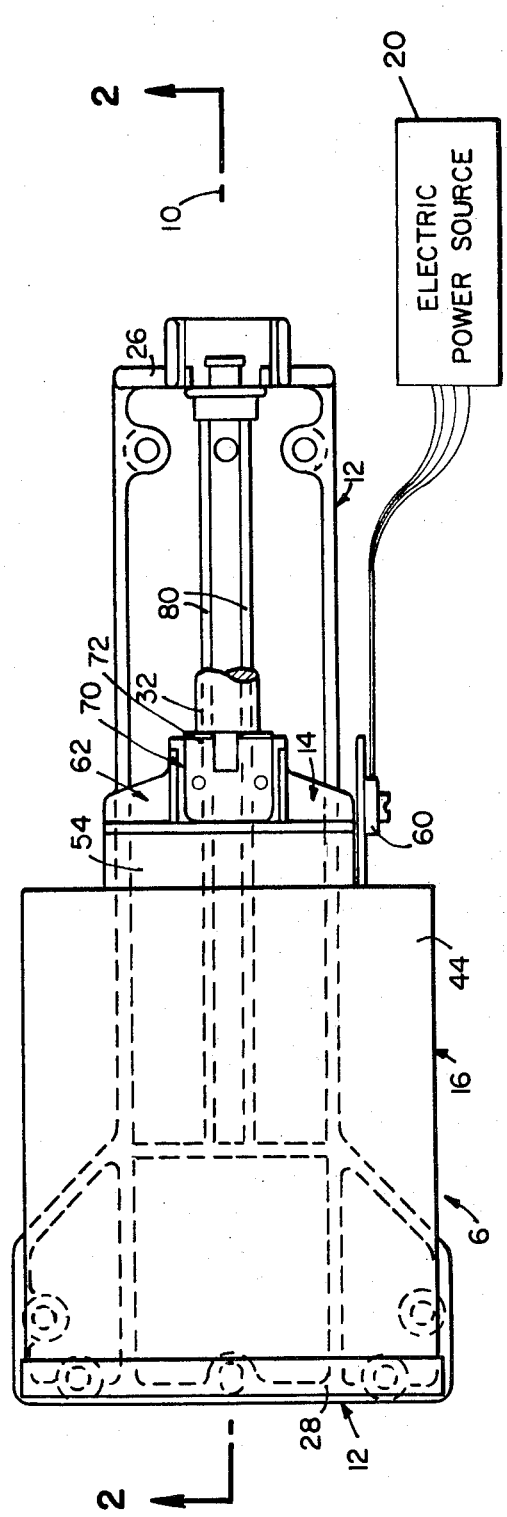
FIG_1
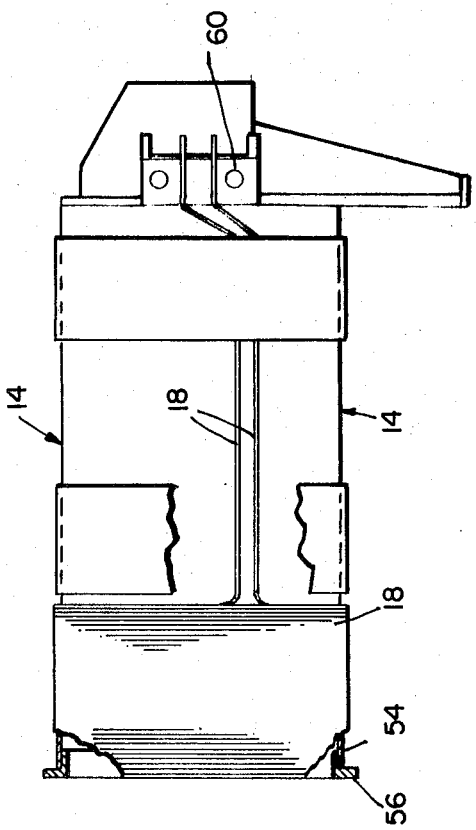
FIG_4

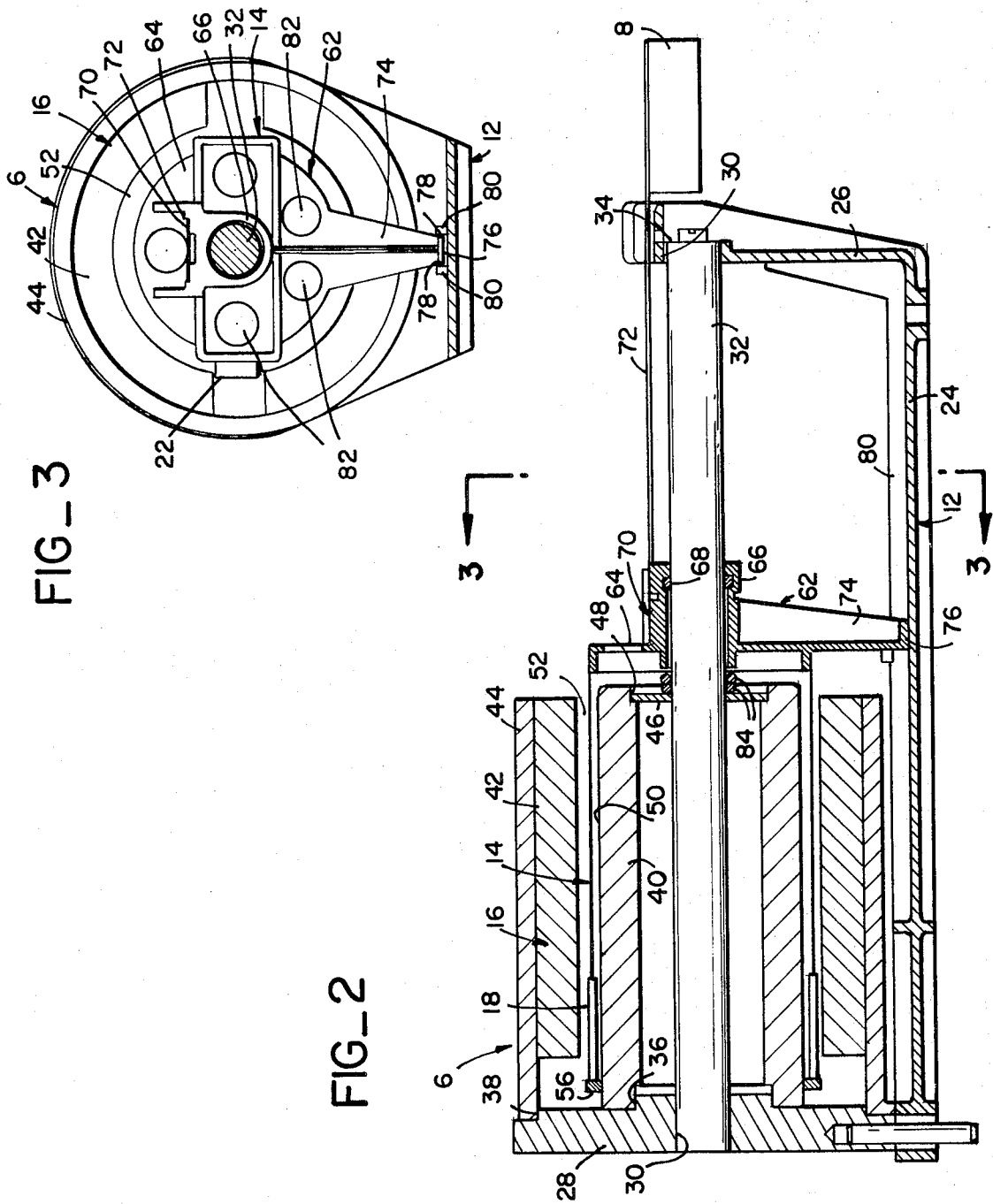

LIGHTWEIGHT LINEAR MOTOR

BACKGROUND OF THE INVENTION

Conventional linear motors for positioning transducers and the like such as electromagnetic pickup heads used on disk memories are relatively intricate and complicated mechanisms that are costly to produce, require a high degree of maintenance, have a relatively high fail-rate and which sometimes lack the required accuracy. For example, a conventional prior art motor for the positioning of a pickup head weighing between 10 and 20 grams has a total moving mass of between 800 to 900 grams. The relatively large weight requires positioning and guidance devices capable of supporting the large weight. In addition, such linear motors have large inertias which make it difficult to substantially instantaneously stop the linear motor as is required for the high speed positioning of the recording head.

A major reason for the excessively large ratio between motor dead weight and actual payload has been the difficulty of designing a motor armature with high precision linear guiding and the required mechanical stiffness for high performance, e.g., high speed operation. To arrive at the desired stiffness the armatures were enlarged and constructed of high strength materials such as aluminum castings. The resulting, relatively heavy armature dictated the use of low friction ball and/or needle bearings to reduce drag and to eliminate the possibility of premature wear of the moving surfaces.

The use of ball and roller bearings required relatively massive hardware for rigidly mounting them which further increased the moving mass. Aside from the experienced mechanical difficulties briefly set forth above this such prior art linear motors set more stringent demands on power amplifiers, power supplies and the cooling of the associated circuitry, thus making the motor more complex and further increasing its costs.

SUMMARY OF THE INVENTION

The present invention provides a lightweight linear motor for electromagnetic pickup heads and the like which has a high response rate and which is constructed of simple, readily available components. As a result, the motor enables substantial cost reductions as compared to linear motors of comparable capacities constructed in accordance with the prior art. The simplicity of the motor reduces manufacturing costs as well as maintenance costs and virtually eliminates breakdowns and ensuing system downtimes.

Generally speaking, a linear motor constructed in accordance with the invention comprises a support structure with a central linear guide rod and a voice coil assembly linearly movable along the rod. A magnet and an associated pole piece, respectively, are disposed on each side of the voice coil and define a space into which the coil slides during linear movements. The magnet or the pole piece defines a cylindrical surface that is concentric with the guide rod. Sliding bearing means such as bronze or teflon sleeve bearings mount the coil assembly to the rod and the cylindrical surface for support and guidance.

The coil assembly is preferably a lightweight, thin-walled plastic tube about which a conductor is coiled. A first end of the tube is provided with a guide ring that supports that end on the cylindrical surface and the other end of the tube is mounted to a carriage slidable along the guide rod. The carriage is a simple, low-cost plastic molding and includes an arm that extends radially away and slidably engages a guide track integrally constructed with the support structure. The guide track prevents rotational movements of the coil assembly.

A linear motor constructed in accordance with the invention of a capacity comparable to that of the above described prior art motor for positioning 10–20 gram electromagnetic pickup heads has a movable armature weight of no more than approximately 85 grams, a roughly 10-to-1 weight reduction. This is possible by constructing the armature of thin-walled, lightweight materials which are shaped to exhibit substantial rigidness while having very little weight; by providing a rigid, high precision yet low cost guide rod along which the armature moves; by utilizing a cylindrical surface of one of the magnets or the pole piece, preferably the convexly cylindrical surface of the pole piece over which the armature moves when it is protracted, for aligning and guiding the coil assembly; and further by replacing the prior art ball and roller bearings with lightweight slide bearings. This last aspect of the invention is primarily possible due to the overall weight reduction and further contributes to the low weight of the movable armature by eliminating the prior art need for massive roller or ball bearing mounts.

As a consequence of the many advantages afforded by the present invention the dead-weight to payload ratio can be lowered to a more reasonable 1:4 to about 1:8 as compared with the prior art ratio of 1:40 to about 1:80. Moreover, complicated mounting of intricate bearings and guideways, expensive machining and critical tolerances, all of which render prior art linear motors very expensive to construct and maintain, can be eliminated so that a linear motor constructed in accordance with the invention can be produced at relatively low costs.

BRIEF DESCRIPTION OF THE DRAWINGS

FIG. 1 is a plan view of a linear motor constructed in accordance with the invention;

FIG. 2 is a side elevation, in section, of the motor illustrated in FIG. 1 and is taken on line 2—2 of FIG. 1;

FIG. 3 is a front elevational view of the motor illustrated in FIG. 1; and

FIG. 4 is an enlarged, partially schematic illustration of the voice coil assembly of the motor of the present invention.

DESCRIPTION OF THE PREFERRED EMBODIMENTS

Referring to FIGS. 1 and 2, a linear motor 6 for positioning objects such as an electromagnetic transducer 8 along a straight line 10 broadly comprises a support structure 12, a linearly movable voice coil assembly 14 carried by the support structure and a magnet assembly 16. The voice coil assembly includes a coiled conductor 18 (see FIG. 4) connected to an electric power source 20. Upon energization of the coiled conductor an electromagnetic force is created which reacts with the magnet assembly and moves the coil assembly back or forth according to the polarity of the current supplied to the conductor. To measure relative movements a linear position transducer 22 is normally provided. The above described operation of the linear motor is conventional.

Referring now to FIGS. 1 through 3, support structure 12 comprises a flat base 24 which includes a perpendicular, integrally constructed end bracket 26 and, at the opposite end of the base, an end plate 28 that is dowled and bolted to the base. The end plate and the bracket include precision aligned openings 30 through which an elongate, precision-ground straight guide rod 32 extends. The rod is suitably secured to the support structure as with a bolted-on spring clamp 34.

End plate 28 includes two circular shoulders 36, 38 which are concentric with bore 30 and, therefore, with guide rod 32. The inner shoulder 36 engages and centers a cylindrically tubular pole piece 40 of magnet assembly 16. A cylindrical magnet 42 of the magnet assembly is secured to a motor shell 44 which engages and is centered by the outer circular shoulder 38 of end plate 28. The pole piece acts as a return path for the flux lines of magnet 42 and as a support and guide for coil assembly 14 as described in detail below.

The pole piece and the magnet extend in the direction of guide rod 32 and have a length no more than and usually slightly less than about one-half the guide rod length so that they terminate at about the midway point of the guide rod. Both have about the same length although the pole piece is preferably slightly longer and acts as a stop for the core assembly. A disk 46 is slipped over the guide rod and anchored in an interior bore 48 of pole piece 40 to position align an outer convex surface 50 of the pole piece with the guide rod. The convex surface has a high quality finish and acts as a bearing surface for one end of the coil assembly.

The magnet preferably comprises a relatively low weight permanent ceramic magnet and the circular shoulders on end plate 28 are arranged so that the pole piece and the magnet are spaced apart to define a relatively narrow and deep or elongate annular space 52 between them into which voice coil assembly 14 can move as illustrated in FIG. 2.

Referring now to FIGS. 1 through 4, the voice coil assembly is constructed of a thin, lightweight epoxy tube 54 having a wall thickness of no more than about 0.031 inches and which has a length about equal to or slightly greater than the length of pole piece 40. A bearing end ring 56 is bonded to the inner end of the epoxy tube. The end ring is constructed of a low-friction material such as self-lubricating bronze, teflon or the like.

Conductor coils 18 extend from adjacent end ring 56 a limited distance towards the other end of tube 54 so that the coils are in annular space 52 irrespective of the relative position of coil assembly 14 between the terminal points of its travel along rod 32. Leads 58 extend forward from the coiled conductor and are secured to a terminal bar 60 for connection to power source 20. The terminal bar is mounted to a carriage 62 which is in turn bonded to the other end of tube 54.

To reduce the overall weight of the coil assembly carriage 62 is constructed of relatively lightweight plastic and is injection molded to assure low cost. It comprises a disk or center portion 64 that has a hub 66 into which a low-friction sleeve bearing ring constructed of self-lubricating porous metal, Teflon or the like is pressed. The bearing ring is concentric with an end ring 56 mounted at the other end of tube 54. The hub also includes an upwardly facing flat surface 70 for mounting a spring arm 72 or the like to which transducer 8 is secured.

Carriage 62 has a downwardly depending arm 74 which extends radially away from hub 66 and which terminates in an end member 76 that includes two oppositely directed faces to which low friction padding 78 is applied. The padding is disposed between two upwardly oriented protrusions 80 which are spaced apart to define a U-shaped channel and which engage the padding to prevent rotational movements of the carriage and, therewith, of coil assembly 14 about guide rod 32 while permitting linear longitudinal movement of the carriage along the rod. For simplicity the protrusions are integrally constructed with base 12.

For purposes more fully set forth hereinafter center portion 64 includes a plurality of circumferentially spaced apertures 82 which communicate one side of the center portion with the other. The apertures permit a free air flow and facilitate the operation of the linear motor. When the coil assembly is at its left-most position (as seen in FIG. 2) and center portion 64 is clearly adjacent annular space 52, linear coil assembly movements do not result in a vacuum or a pressure build-up in the annular space because air can freely communicate through apertures 82.

Turning now to the assembly and operation of the linear motor of the present invention and referring to FIGS. 1 through 4, pole piece 40 is bonded to end plate 28 with a suitable epoxy or the like in a precision jig to assure precise alignment and concentricity between end plate bore 30 and convex surface 50 of the motor center. Thereafter the motor shell 44 with magnet 42 is secured to the end plate by placing motor shelf 44 over the outer shoulder and bonding it to the end plate.

Guide rod 32 is inserted through one of the bores 30, disk 46 is placed over the guide rod and positioned with a retaining ring (not shown) or the like and voice coil assembly 14 is slipped over the unsupported guide rod end. Resilient rings such as rubber O-rings 84 are placed over guide rod 32 against the outer side of disk 46. Bearing ring 56 is slipped over the polished cylindrical pole piece surface 50 and bearing ring 68 over the guide rod and the guide rod is anchored in bores 30 with clip 34 or the like. The rubber O-rings serve as a resilient stop when the carriage moves to the left, as viewed in FIG. 2, and thereby reduce deceleration forces.

Power source 20 is now connected with leads 58 via terminal bar 60, spring arm 72 with transducer 8 is secured to the carriage and the carriage is positioned so that arm 74 is retained between base protrusions 80.

The linear motor of the present invention is now ready for operation. Energization of the coiled conductor 18 moves the coil assembly along the guide rod and the convex pole piece surface by virtue of the electromagnetic field generated by the conductor. Reversal of the current permits reversal of the direction of motor movement. The linear position transducer 22 is suitably connected with controls (not shown) for energizing and/or de-energizing the coiled conductor when it reaches a desired point along its linear travel.

When the voice coil assembly is energized and moved along the guide rod a relatively small mass is in motion. The carriage is a lightweight plastic injection molding, tube 54 is a thin-walled lightweight epoxy-glass tube which mounts the required conductor coils and one of the simple, narrow and lightweight bearing rings. The other bearing ring, also of a simple, lightweight construction which needs little supporting structure, particularly when compared to the required supporting structure for ball or roller bearings, is mounted to carriage hub 62. In spite of the lightweight construction, unacceptable deflection of the coil assembly is prevented because the components of the coil assembly are constructed of rigid materials because they are epoxy-bonded to each other to form a unitary, integral and high-strength unit, and because the coil assembly is carried by lightweight bearing sleeves instead of relatively heavy ball or roller bearings that need a great deal of structural support. In this manner the heretofore large moving mass of linear motors is greatly reduced. The resulting motor of the invention is of much lower weight, has a much higher response rate and can be manufactured at a cost significantly less than the cost of comparable prior art motors.

I claim:

1. A linear positioning motor comprising:
   a support structure including a central linear guide rod extending over the full effective length of the support structure and further including channel means spaced from and parallel to the rod and extending over at least a portion of the rod length;
   a voice coil assembly:
   means mounting the voice coil assembly for linear movements along the rod;
   magnet means spaced from and parallel to the rod extending over a portion of the rod length;
   means connected with the assembly and extending into the channel means to prevent rotational movements of the assembly; and
   means for subjecting the assembly to current for moving the assembly along the rod.

2. A motor according to claim 1 wherein the magnet means includes a surface parallel to the rod, and including means supporting a portion of the assembly on the surface during all movements of the assembly along the rod.

3. A motor according to claim 1 wherein the assembly mounting means comprises sleeve bearings.

4. A low-cost, lightweight linear motor for accurately positioning a recording head or the like along a straight line comprising:
   a support structure;
   magnet means secured to the structure and defining an annular elongate space;
   an annular electric coil assembly insertable into the annular space;
   sliding bearing means affixed to said assembly for supporting a portion of the assembly on said magnet means and permitting linear assembly movements along the axis of the annular space and
   means for mounting the recording head or the like to an end of the assembly.

5. A motor according to claim 4 including a guide rod secured to the support structure and disposed concentrically with the annular space, wherein the assembly includes carriage means disposed at one end of the assembly, and wehrein the sliding bearing means includes a first sleeve bearing disposed adjacent another end of the assembly, and a second sleeve bearing secured to the carriage means and engaging the rod for slidable movement therealong.

6. A motor according to claim 5 including bar means projecting from the structure and oriented parallel to the guide rod, and including sliding pads mounted to the carriage means engaging the bar means and preventing rotational movements of the carriage means and the assembly about the concave surface and the guide rod.

7. A motor according to claim 4 including a guide rod secured to the support structure concentrically with the annular space and having a length at least about twice the length of the annular space, wherein the magnet means is defined by an outer annular magnet and an inner annular magnet pole piece spaced from the outer magnet to define the annular space, the pole piece being further spaced from the guide rod, means concentrically supporting the magnet and the pole piece, the supporting means including disk means facing in the direction of the guide rod, and wherein the coil assembly includes a carriage slidable along the guide rod between a free end thereof and the disk means for supporting one end of the coil assembly.

8. A motor according to claim 7 including at least one annular stop ring disposed about the guide rod and resting against the disk means for limiting the movement of the coil assembly, the stop ring being constructed of a resilient material to limit the deceleration forces when the moving carriage means engages the ring.

9. A lightweight linear motor for precision positioning an object along a straight line comprising a support structure, a guide rod having ends secured to the support structure and an intermediate portion spaced from the structure, an annular pole piece having a lesser length than the guide rod and a first end secured to the support structure adjacent a point where an end of the guide rod is secured to the structure, the pole piece extending in the direction of the rod and having a free second end, an annular magnet having a first end secured to the support structure adjacent the point, the magnet terminating at a second end approximately aligned with the second end of the pole piece, the pole piece and the magnet being spaced from each other to define an annular space between them defined by at least one cylindrical surface which is concentric with the rod, an annular voice coil assembly having a lesser length than the rod, and being dimensioned to be insertable into the annular space, one end of the assembly including a first sliding sleeve engaging the cylindrical surface for guidance during linear slidable movements of the assembly, another end of the assembly being defined by a carriage having a second sleeve bearing in sliding engagement with the rod for linear slidable movement therealong and an arm extending generally radially away from the bearing towards the support structure, at least one elongate protrusion parallel to the rod defined by the support structure, means defined by the arm for preventing rotational movements of the assembly, means for securing the object to the carriage, a conductor secured to the assembly and dimensioned to be disposed within the annular space at all operative positions of the assembly in the annular space, and means for supplying the conductor with electric current so that an electromotive force generated between the conductor and the magnets linearly moves the assembly along the rod and the cylindrical surface.

10. A motor according to claim 9 wherein the carriage comprises a lightweight plastic molding.

11. A motor according to claim 10 wherein th molding is defined by a disk portion disposed about the rod, and wherein the arm extends radially outwardly from the disk portion, the disk portion defining a hub mounting the second bearing to the carriage and a plurality of apertures permitting air communication from one side of the disk portion to the other side to prevent the formation of a vacuum or the build-up of pressure within spaces enclosed by the magnets during operation of the motor.

12. A motor according to claim 11 wherein the assembly includes a tubular plastic shell insertable into the annular space, and wherein the conductor is wound about the exterior of the plastic shell.

13. A motor according to claim 12 including means supporting the free second end of the pole piece on the rod, and including at least one resilient O-ring disposed on the side of the last mentioned means facing towards the carriage for providing a resilient stop limiting slidable movements of the carriage towards the pole piece and reducing the deceleration forces to which the carriage is exposed. like 14. A motor according to claim 9 wherein the magnet comprises a permanent ceramic magnet, wherein the pole piece defines the cylindrical surface in the form of a concave surface, and wherein the first bearing slidably engages the concave surface of the pole piece.

15. A motor according to claim 9 wherein the protrusion comprises a pair of parallel, spaced apart protrusions constructed integrally with the support structure and defining parallel opposing faces extending parallel to the rod, and wherein the arm includes an end portion and friction pads positioned to engage and slide along the parallel protrusion faces to thereby prevent rotational movements of the assembly about the rod.

16. A motor according to claim 9 wherein the support structure includes an end plate demountably fastened to a base plate and extending substantially perpendicularly away therefrom, the end plate including first and second annular shoulders for securing the magnets to the end plate, and a bore concentric with the shoulders for engaging the guide rod, and including means demountably fastening the magnets and the guide bar to the support structure.

17. A linear positioning motor, comprising:
a support structure including a central linear guide rod;
magnet means spaced from and concentric with said guide rod and extending over at least a portion of the rod length, said magnet means defining an annular channel spaced outwardly from said rod;
a voice coil assembly adapted for movement within said channel axially of said rod;
slidable bearing means associated with said assembly and mounting at least a portion of said assembly on said magnet means for reciprocal linear movement within said channel; and
means for subjecting said assembly to electrical current for movement within said channel.

18. A motor according to claim 17, wherein said slidable bearing means comprises at least one sleeve-bearing affixed to at least a portion of the interior surface of said voice coil assembly and adapted for slidable movement along a convex surface of said magnet means defining a wall of said annular channel.

19. A linear positioning motor comprising:
a support structure including a central linear guide rod;
a voice coil assembly;
means slidably mounting a portion of the voice coil assembly on the rod for linear movement therealong;
magnet means parallel to and spaced outwardly from the rod and extending over a portion of the rod length;
means slidably mounting another portion of the voice coil assembly on a surface of the magnet means for linear movement therealong; and
means for subjecting the assembly to current for moving the assembly along the rod.

* * * * *